United States Patent
Poetsch et al.

(10) Patent No.: US 7,400,821 B2
(45) Date of Patent: Jul. 15, 2008

(54) DEVICE AND METHOD FOR REPRODUCING PHOTOGRAPHIC SOUND RECORDINGS

(75) Inventors: Dieter Poetsch, Ober-Ramstadt (DE); Detlef Richter, Wiesbaden (DE); Jochen Huegel, Wiesbaden (DE)

(73) Assignee: Thomson Licensing, Boulogne-Billancourt (FR)

( * ) Notice: Subject to any disclaimer, the term of this patent is extended or adjusted under 35 U.S.C. 154(b) by 1232 days.

(21) Appl. No.: 10/380,014

(22) PCT Filed: Aug. 22, 2001

(86) PCT No.: PCT/EP01/09686

§ 371 (c)(1),
(2), (4) Date: Mar. 11, 2003

(87) PCT Pub. No.: WO02/21821

PCT Pub. Date: Mar. 14, 2002

(65) Prior Publication Data

US 2003/0165087 A1    Sep. 4, 2003

(30) Foreign Application Priority Data

Sep. 11, 2000   (DE)   ................ 100 44 978

(51) Int. Cl.
| H04N 5/91 | (2006.01) |
| H04B 1/20 | (2006.01) |
| G11B 21/08 | (2006.01) |
| G11B 5/02 | (2006.01) |
| G11B 5/09 | (2006.01) |

(52) U.S. Cl. ................ 386/104; 369/13.56; 369/44.11; 369/121; 369/124.15; 369/125; 352/5; 352/26; 352/27; 352/37; 360/27; 360/32

(58) Field of Classification Search ................ 386/104; 369/13.56, 44.11, 121, 124.15, 125; 348/56, 348/571, 614, E13.005; 352/5, 26, 27, 37; 360/13, 27, 32; 375/E7.14, E7.144; 382/107; 714/747, 758
See application file for complete search history.

(56) References Cited

U.S. PATENT DOCUMENTS

| 4,124,784 A |   | 11/1978 | Johnson et al. | .......... 179/100.3 |
| 4,211,997 A | * | 7/1980 | Rudnick et al. | ............. 714/758 |
| 4,286,294 A | * | 8/1981 | Nakauchi et al. | ............... 360/27 |
| 4,577,302 A | * | 3/1986 | Allen | ...................... 369/44.11 |
| 4,947,158 A | * | 8/1990 | Kanno | ........................ 345/441 |

(Continued)

FOREIGN PATENT DOCUMENTS

DE        197 37 570        3/1999

(Continued)

*Primary Examiner*—Thai Tran
*Assistant Examiner*—Syed Y Hasan
(74) *Attorney, Agent, or Firm*—Joseph J. Laks; Robert B. Levy; Jorge T. Villabon

(57) ABSTRACT

For a reproduction of optical sound information in a double variable-area track (DZ) an optoelectronic converter device scans the optical sound track of a film. The converter device generates a digital image signal for buffer storage in the memory of a program-controlled data processing device. The data processing device derives the profile of the two edges of the double variable-area track from data values of the buffer-stored image signal. Audio data for a sound reproduction are generated using data about the edge profile determined.

17 Claims, 3 Drawing Sheets

U.S. PATENT DOCUMENTS

| | | | | |
|---|---|---|---|---|
| 5,121,377 | A * | 6/1992 | Short | 369/107 |
| 5,141,306 | A * | 8/1992 | Gasoi | 352/244 |
| 5,237,559 | A * | 8/1993 | Murphy et al. | 369/125 |
| 5,448,300 | A * | 9/1995 | Yamada et al. | 348/571 |
| 5,526,075 | A * | 6/1996 | Carlsen, II | 352/26 |
| 6,031,565 | A * | 2/2000 | Getty et al. | 348/56 |
| 6,303,411 | B1 * | 10/2001 | Camm et al. | 438/149 |
| 6,304,990 | B1 * | 10/2001 | Shikakura et al. | 714/747 |
| 6,480,615 | B1 * | 11/2002 | Sun et al. | 382/103 |
| 2002/0039204 | A1 | 4/2002 | Poetsch | |

FOREIGN PATENT DOCUMENTS

EP    1 091 573    4/2001

* cited by examiner

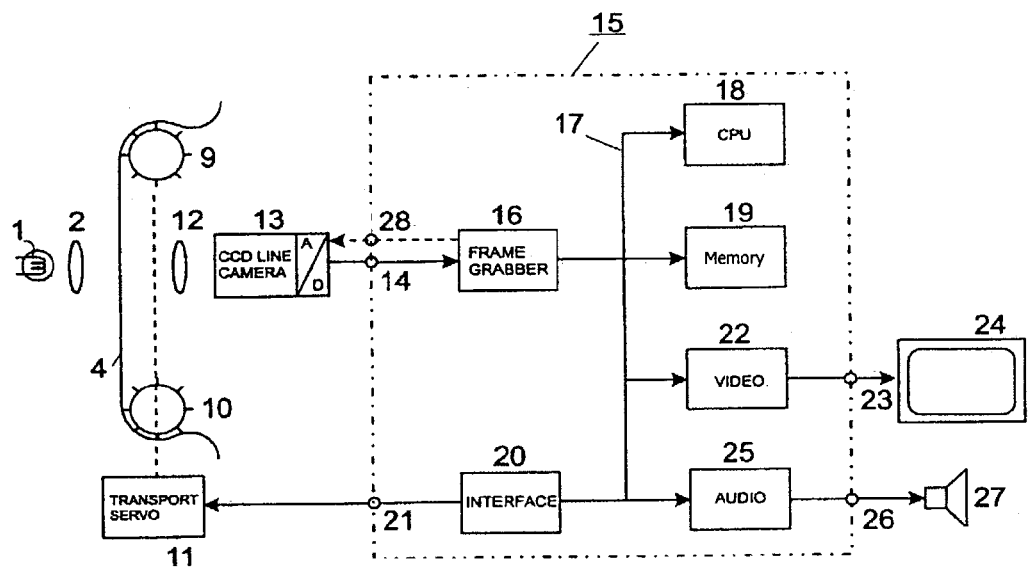
FIG. 1
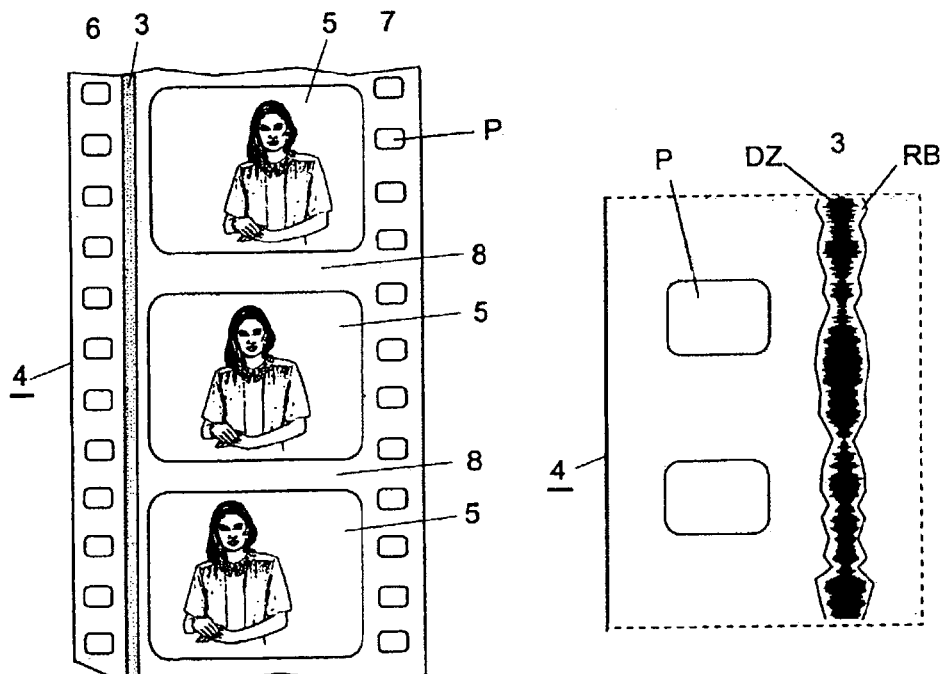
FIG. 2
FIG. 3

DEVICE AND METHOD FOR REPRODUCING PHOTOGRAPHIC SOUND RECORDINGS

This application claims the benefit under 35 U.S.C. § 365 of International Application PCT/EP01/09686 filed Aug. 22, 2001, which claims the benefit of German Application No. 10044978.6, filed Sep. 11, 2000.

BACKGROUND OF THE INVENTION

The invention relates to an apparatus for the reproduction of optical sound recordings, which has an optoelectronic converter device for the optical scanning of an optical sound track, which outputs a digital image signal of the scanned optical sound track at an output, and which contains a device for buffer-storing the image signal output by the converter device. Furthermore, the invention relates to a method for the reproduction of optical sound recordings, in particular optical sound recordings in which the sound information is recorded as a double variable-area track on film.

In the case of 35 mm cinema films, the sound information is recorded on an optical sound track which is located between image information and lateral perforation holes. For the reproduction of the sound information, the film is transported at a speed of 24 frames per second. While the film is being transported, a light beam illuminates the optical sound track. The light beam is modulated by transparency differences in the scanned optical sound track and directed onto a light-sensitive sensor. For loudspeaker reproduction, the analogue sound signal output by the light-sensitive sensor is amplified.

There are various optical sound tracks. In the case of the so-called variable-density track, the transparency of the optical sound track is proportional to the recorded modulation amplitude. In the case of the so-called double variable-area track, the width of the clear area is proportional to the modulation amplitude of the sound signal.

Older films that are frequently used often exhibit two types of error: one type involves dirt and dust on the surface of the film; the other type involves scratches in the running direction of the film, so-called running scratches, which are caused by mechanical contact of the film guiding elements with the film surface. Optical sound tracks are particularly sensitive to disturbances caused by dirt and scratches, the number of which rises with the number of times that the film copy is projected. Distortions of speech sibilants, a so-called thunder effect, can arise as a result of scattered light effects of the variable-area track.

In order to restore old cinema films, nowadays the image part is copied onto a new film carrier and the optical sound track is transferred to a magnetic film in single-track fashion in order to prevent the sound tracks that are often scratched and in part disturbed by dirt from being transferred to the new film carrier as a result of optical copying of the optical sound tracks. Furthermore, sound post-processing with electronic filters and manual processing is used in an attempt to remove clicks and crackling from the original sound.

DE 197 29 201 A1 has already described a film scanner with a device for scanning optical sound tracks on a tape-type carrier, in the case of which the sound information is scanned perpendicularly to the direction of movement of the carrier by an opto/electronic converter device. The opto/electronic converter device scans the sound information line by line in order to generate samples for a digital two-dimensional filtering. In this case, the optical sound tracks can be scanned by a CCD line sensor or by a light spot for the control of a photosensor, which light spot is directed transversely over the sound tracks.

U.S. Pat. No. 4,124,784 A discloses an apparatus for the reproduction of optical sound recordings in which the edge of the optical sound track is scanned. An analogue scanning signal filtered in a suitable manner forms the basis for the signal processing. The purpose of the apparatus is to improve the sound signal and to reduce noise.

DE 19 737 570 A discloses an archiving system for cinematographic film material with a film scanner. The film scanner optically scans the image information and an image sound track. The image data are stored in digitized form without further processing. Sound and image signals are reproduced as separate data signals.

SUMMARY OF THE INVENTION

The present invention is based on the object of providing an apparatus and a method for the reproduction of optical sound recordings of the type mentioned in the introduction, which makes it possible to eliminate disturbances.

This object is achieved according to the invention by means of an apparatus for the program-controlled data processing of the buffer-stored image signal, which firstly determines the profile of edges of a variable-area track from data values of the image signal and which then generates audio data for a sound reproduction from data of the edge profile determined.

The invention has the advantage that the digital image signal generated by scanning an optical sound track can be examined using digital image processing means. Sound information which has been recorded as a single, double or multiple variable-area track on the sound track of a film can now be subjected to error concealment and/or error correction beforehand—before the sound information is present as useful information—, the image information on the sound track, rather than the sound information per se, being examined and subjected to error concealment and/or error correction.

In one embodiment of the invention, it is provided that the data values of pixels of the buffer-stored image signal, representing brightness values, are subjected to a filtering in a program-controlled manner over the duration of a plurality of lines. Brightness values of the pixels can be changed according to a predetermined function, e.g. according to a linear or a nonlinear transfer function. Very bright pixels can be filtered out or bright and dark pixels can be compressed in the brightness range. The filtering makes it possible to steepen the sudden brightness changes at the optical sound edges of a variable-area track. The dynamic range is optimized by a normalization filter. By checking a number of lines, the data values for black (maximum film density) are corrected to 0% and the data values for white (minimum film density) to 100% of the range of brightness values.

In the case of the variable-area track, the width of the transparent area on the optical sound track of a film is proportional to the modulation amplitude of the recorded sound signal. Therefore, for the reproduction of a sound information item recorded in the variable-area track, it is of crucial importance to determine the profile of the boundary-of the transparent area, i.e. the edge profile of the variable-area track.

In an advantageous embodiment of the invention, in order to determine the edge profile of a double variable-area track, it is proposed that, in a first step, in a program-controlled manner, the position of edge boundaries running transversely with respect to the longitudinal direction of the film is determined using the position of sudden brightness changes in the line profile by evaluation of the data values of the pixels representing brightness values, that, in a second step, a track centre running between the edge boundaries determined is calculated, and that, in a third step, the buffer-stored pixel data are mirrored at the calculated track centre, thereby producing pixel data of a single variable-area track. The symmetry property of the double variable-area track is advantageously utilized in this case.

In accordance with one development of the invention, the program of a data processing device is created such that, during the evaluation of pixel data of a double variable-area track the position region of the track centre is limited by setting an upper and lower threshold. In another development, the profile of edge boundaries determined and/or the profile of the track centre is smoothed according to a predetermined function.

As mentioned in the introduction, the double variable-area track recorded on the sound track of a film may have errors. According to an embodiment of the invention, a program of the data processing device has at least one test routine for detecting errors in a double variable-area track. A simple test routine consists in an overshooting of the upper and/or lower threshold of the position region of the track centre determined being assessed as an error in the edge profile of the double variable-area track. Another test routine-provides for the overshooting of a specific boundary in the edge profile of the double variable-area track being assessed as an error in the edge profile of the double variable-area track.

In order to conceal errors identified in the image of the examined double variable-area track, the program of the data processing device has at least one routine for concealing errors in a double variable-area track. In this case, the program is configured in such a way that a pixel value that has been identified as erroneous is replaced by the pixel value of a preceding line. If the two edge pixels cannot be found within a line due to image errors, the pixel values of the preceding line should serve as replacement pixels.

Another advantageous solution consists in creating the program of the data processing device such that data values of pixels identified as erroneous between the edge boundaries of the double variable-area track are replaced by predetermined data values, for example by data values corresponding to black pixels. The data values of pixels identified as erroneous which are located outside the edge boundaries of the double variable-area track are to be replaced by data values corresponding to a grey pixel.

Furthermore, it is advantageous to configure the program of the data processing device such that when errors are detected in pixels outside the edge boundaries of a double variable-area track the data value of an erroneous pixel is replaced by a data value determined by autocorrelation. Completely destroyed sound track regions at splices in the film or at locations at which there are so-called sound flies on the film can be regenerated—at least in part—by extrapolation. The severe click disturbances audible at splices and the sound dropouts audible in the case of sound flies can be alleviated.

Erroneous pixels identified in segments of the edge profiles can advantageously be calculated according to an autocorrelation function in accordance with the following algorithm:

$$a_{before}(n) = \frac{1}{a(0)} * \sum_{i=0}^{N-1} g(y-i) * g(y-i-n)$$

where
g(y) is a grey-scale value,
y is a line number,
i is a running index from 0 to N−1,
n is a variable of the autocorrelation function where n=0 to N−1,
N is the number of undisturbed lines to be used for restoration.

Erroneous pixels are then to be replaced by grey-scale value pixels whose position within a line satisfies the following function:

$$g(z) = \frac{Z+1-z}{Z+1} * g(Z - P_{before}) + \frac{z}{Z+1} * g(z + P_{after})$$

where
g(z) denotes a grey-scale value to be replaced,
Z denotes the number of lines to be replaced,
z denotes the line number, $1 \leq z \leq Z$.
$P_{before}$ and $P_{after}$ denote the periodicities in sound tracks before and, respectively, after a detected error.

One development of the invention comprises a method for the reproduction of optical sound recordings, in which a digital image signal is generated by scanning an optical sound track, in which data of the image signal generated are buffer-stored, in which an edge profile of a variable-area track recorded on the optical sound track is determined in a manner dependent on values of the buffer-stored data, and in which corresponding audio data for a sound reproduction are derived in a manner dependent on the edge profile determined.

BRIEF DESCRIPTION OF THE DRAWINGS

The invention will now be described and explained in more detail using exemplary embodiments illustrated in the drawings, in which:

FIG. 1 shows an optical scanning device for optical sound tracks and also a block diagram for the processing of image data of the scanned optical sound tracks in accordance with the invention, FIG. 2 shows the diagrammatic illustration of a 35 mm cinema film, FIG. 3 shows the enlarged illustration of an optical sound track in a double variable-area track.

Identical parts bear identical reference symbols in the figures.

DETAILED DESCRIPTION

Figure 4:
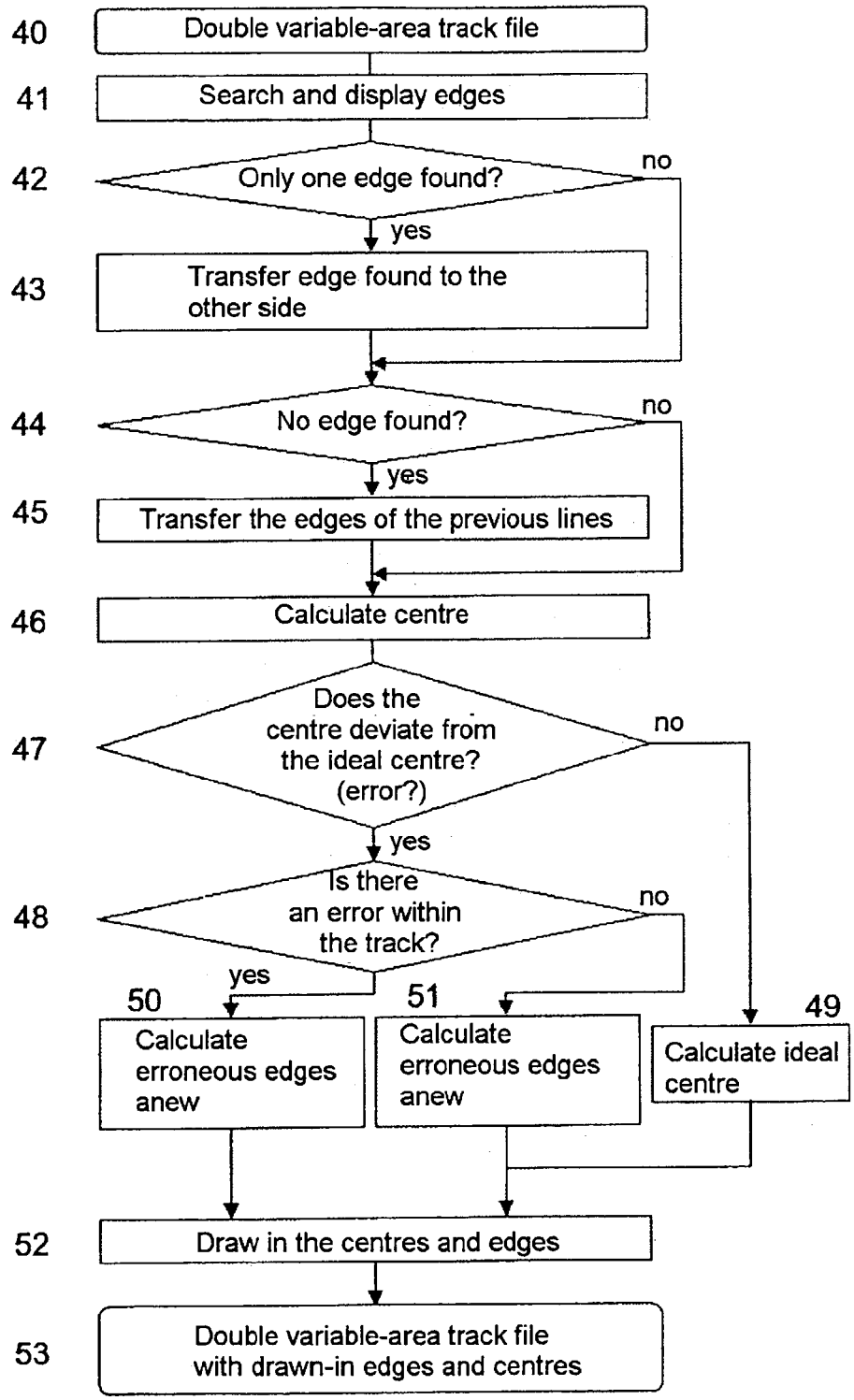
FIG. 4 shows a flow diagram for the image processing of optical sound information in a double variable-area track.

In FIG. 1, 1 designates an illumination source. The light from the illumination source 1 radiates onto an optical sound track 3 of a film 4 via a first condenser 2.

FIG. 2 shows the position of the optical sound track 3 on a 35 mm cinema film 4. In the case of the 35 mm cinema film, the optical sound track 3 has a track width of 2.5 mm. The optical sound track 3 is located on one side between film image windows 5 having a width of 22 mm and a first perforation track 6. A second perforation track 7 runs on the other side of the film image windows 5. The perforation tracks 6 and 7 are provided for transporting the film; they have perforation holes P. The image height of a 35 mm cinema film is 16 mm; the image position has 19 mm. The film image windows 5 are separated by frame lines 7 in the longitudinal direction of the film 4.

A detail from the optical sound track 3 is shown enlarged in FIG. 3. It shall be assumed that the optical sound track 3 contains, as optical sound information, a double variable-area track DZ with pure tone control RB. The double variable-area track DZ extends in the longitudinal direction of the film 4 as a blackened track. As mentioned in the introduction, in the case of the double variable-area track DZ the width of the clear area is proportional to the modulation amplitude of a recorded sound signal.

The film is transported through two toothed rollers 9 and 10, which engage in perforation holes P in the perforation tracks 6 and 7 running laterally with respect to the film 4. The toothed rollers 9 and 10 are operatively connected to motors (not illustrated) whose rotational speed is regulated by a film transport servo 11. The transport speed of a 35 mm cinema film is 24 frames per second (=45.6 cm/s).

Arranged on the opposite side of the film 4 is a second condenser 12, which directs a light beam modulated by the optical sound track 3 onto a line camera 13. In the present exemplary embodiment; the line camera 13 contains a CCD line sensor with 512 image sensors. The line camera 13 outputs an RS-422 data signal with a word width of 8 bits per pixel. The RS-422 data signal of the optical sound track 3 passes via a data input 14 to a program-controlled data processing device 15.

The data processing device 15 contains a frame grabber 16, whose input is connected to the data input 14 of the data processing device 15. An output of the frame grabber 16 is connected to a bus system 17. The following are furthermore connected to the bus system 17: a CPU 18, a memory 19 for program and data storage, an interface 20 with a terminal 21 for transferring servo data from and to the film transport servo 11, a video output device 22 with an output terminal 23 for transferring a video signal to a monitor 24, and an audio output device 25 with an output terminal 26 for transferring an audio signal to a loudspeaker 27.

The frame grabber 16 conditions a serial image data sequence of the optical sound tracks 3, which sequence is generated by the line camera 13, buffer-stores it and forwards it with a resolution of 8 bits via the bus system 17 to the memory 19, in which the image data are stored in a RAW file format. The frame grabber 16 has an output 28 for the synchronization of the line camera 13. In order to limit the data transfer rate, the scanning frequency of 24 frames per second can be reduced to 6 frames. If the optical sound track 3 is scanned at 2000 lines per film frame, a Nyquist frequency of 24 kHz is obtained with a film transport speed reduced to 6 frames. An amount of 24 Mbytes of data is to be written to the memory 19 per second in this case.

The volume of data supplied by the frame grabber 16 is comparatively large. The image data of the optical sound track 3 are therefore written to a mass storage device, for example to a disk store of the memory 19. The application programs for processing the data of the optical sound track 3 and for regulating the film transport are stored in RAM and ROM memories of the memory 19.

In order to monitor the settings of the illumination source 1 and of the line camera 13 during the scanning operation, the video output device 22 is provided, which converts the digital image data of the scanned optical sound track 3 into an analogue video signal for display on the monitor 24.

For image monitoring of the optical sound track 3, an analogue video signal can also be tapped off directly from the output of the line camera 13 and be fed to the monitor 24. It is also possible, of course, to feed the analogue video signal to the input of an oscilloscope (not illustrated) in order to check settings of the luminous flux for maximum signal levels depending on film density or the focussing and position of the line camera 13 with respect to the optical sound tracks 3.

The audio output device 25 serves for listening monitoring. In the audio output device 25, the image data of the double variable-area track DZ that are present in the RAW file format are converted into an audio file format, e.g. a WAV file format.

In order to couple the scanning frequency of the line camera 13 to the transport speed of the film 4, the film transport servo 11, which controls the motors of the toothed rollers 9 and 10, is regulated by data which the data processing device 15 derives in a program-controlled manner using the image data signal generated by the line camera 13. The interface 20 is designed for a bidirectional transfer of data between the film transport servo 11 and bus system 17, so that it is possible to exchange desired and actual data values of the rotational speeds of the toothed rollers 8 and 9.

As a result of repeated copying of a film onto new film carriers, shading of the homogeneous grey-scale values arises in the event of inaccurate positioning of the film and/or of the optical copying device. Furthermore, dust particles on the film negative or film positive, during copying, cause dark or bright spots on the optical sound track 3. Moreover, in the event of repeated playback of the film 4, mechanical damage in the film running direction can arise; films can also tear. The optical sound track 3 of a spliced film 4 may be covered by so-called sound flies having the form of a triangle, resulting in sound disturbances. During a copying operation, incident light at locations of the perforation or of the film frame can produce periodic brightness fluctuations which are manifested in a 24 Hz or 96 Hz hum in the reproduced optical sound information.

The pixel data of the optical sound track 3, which are buffer-stored in the memory 19, are firstly to be subjected to a fixed pattern noise (FPN) correction. Details about this correction can be gathered from the earlier German Patent Application P 100 44 978 6.

In a next processing step, the brightness range of the digital image signal generated by scanning the optical sound track 3 is to be optimized. In this case, data values of the buffer-stored pixels of a plurality of lines, representing brightness values, are subjected, in a program-controlled manner, either to a linear or to a nonlinear filtering. Brightness values of the pixels are altered in such a way that an erroneous image signal of the double variable-area track, which image signal is produced by alternate film densities or alternate illumination, has only image components with constant black and constant white.

During the linear filtering, the brightness of extremely bright pixels is limited. For filtering, the data values of the buffer-stored pixels of the image signal generated by scanning the optical sound track 3 are advantageously multiplied by a normalization factor. The normalization factor is calculated according to the following equation:

Normalization factor=255/bright value

The bright value used in the equation is the average maximum bright value of the first 2000 lines in the image signal. The bright value is determined by determining in each case the brightest value in 2000 lines. An average value is formed from the 2000 brightness values determined.

The new, changed brightness value of pixels is calculated according to the following equation:

Pixel (new)=Pixel (old)*Normalization factor

During the nonlinear filtering, bright and dark pixels are compressed according to a cosine function, average grey-scale values not being influenced. This measure corresponds to edge steepening in an analogue image signal at black/white transitions.

The nonlinear filter changes brightness values of the pixels according to the following equation:

$$\text{Pixel(new)} = \frac{255}{2} - \frac{255}{2} \cdot \cos\left(\frac{\text{Pixel(old)} \cdot \pi \cdot 2}{255 \cdot 2}\right)$$

The two-sided edge profile of a double variable-area track determines the frequency and the amplitude of the recorded sound information. In practice, however, the edge does not comprise an abrupt sudden change in brightness, but rather a continuous transition from bright to dark, or vice versa. The length of the edge is not constant in this case; it varies with the frequency and the amplitude of the sound information. In the case of line-by-line scanning of the optical sound track 3 by a CCD line camera having 512 pixels per line, the brightness transition of an edge can encompass a range between 8 and 40 pixels.

A distinguishing characteristic for the exact position of the left-hand and right-hand edges of the double variable-area track DZ is the presence of an average grey-scale value in the pixel sequence. In an analogue image signal, the average grey-scale value would correspond to the edge centre in a sudden brightness change. The value of the average grey-scale value can be calculated line by line as follows:

$$\overline{\text{White value}} = \frac{1}{\sum_{g=\text{White value}-20}^{\text{White value}+20} \text{Number}(g)} \sum_{g=\text{White value}-20}^{\text{White value}+20} \text{Number}(g) \cdot g$$

where g corresponds to the grey-scale value.

$$\overline{\text{Black value}} = \frac{1}{\sum_{g=\text{Black value}-20}^{\text{Black value}+20} \text{Number}(i)} \sum_{g=\text{Black value}-20}^{\text{Black value}+20} \text{Number}(g) \cdot g$$

$$\text{Grey} - \text{scale value} = \frac{\overline{\text{White value}} \cdot \overline{\text{Blackvalue}}}{2}$$

where the white value or black value is a value found in a histogram.

An edge in the double variable-area track is present if the following condition is met:

$$\left|\frac{Pix_{n-2} + Pix_{n-1} + Pix_n}{3} - \text{Grey} - \text{scale value}\right|$$
$$> \left|\frac{Pix_{n-1} + Pix_n + Pix_{n+1}}{3} - \text{Grey} - \text{scale value}\right|$$
$$< \left|\frac{Pix_n + Pix_{n+1} + Pix_{n+2}}{3} - \text{Grey} - \text{scale value}\right|$$

Here, $PiX_n$ corresponds to the data value of a pixel at the location n within a line.

If the condition is met, a check is supplementarily made to determine whether the edge is continuous over a region of ±2 pixels. If that is the case, then an edge pixel and thus the pixel-accurate position of an edge within a scanning line have been found.

Since the centre of an optical sound track does not correspond to the centre of the recorded double variable-area track due to recording errors, the centre of the double variable-area track is calculated line by line using the two edges in the present exemplary embodiment.

In order to determine the centre of a double variable-area track even more accurately, according to the invention the edges are firstly calculated with subpixel accuracy. In this case, the precise grey-scale value is sought around the edge pixels found previously. The new pixel location is the subpixel-accurate position of an edge. The left-hand edge is calculated according to the following equation:

$$exactEdgeLeft = (EdgeLeft - 1) + \left(2 * \frac{Pix_{EdgeLeft-1} - Grey - scale\ value}{Pix_{EdgeLeft-1} - Pix_{EdgeLeft+1}}\right)$$

In the equation, "Pix" corresponds to the value of the pixel, and "EdgeLeft" corresponds to the location of the pixel.

The right-hand edge is correspondingly calculated with subpixel accuracy.

If the location of the two edges within a line has been found with subpixel accuracy, the centre of the double variable-area track can now also be calculated with subpixel accuracy. This is done according to the following equation:

Centre=(EdgeRight+EdgeLeft)/2

In order to assess the centre more accurately, an ideal centre is subsequently calculated. The ideal centre is averaged over 50 lines, lines which deviate from this ideal centre by a specific value ("ERROR") not being included in the calculation. In this case, an error is identified in this line.

Figure 5:
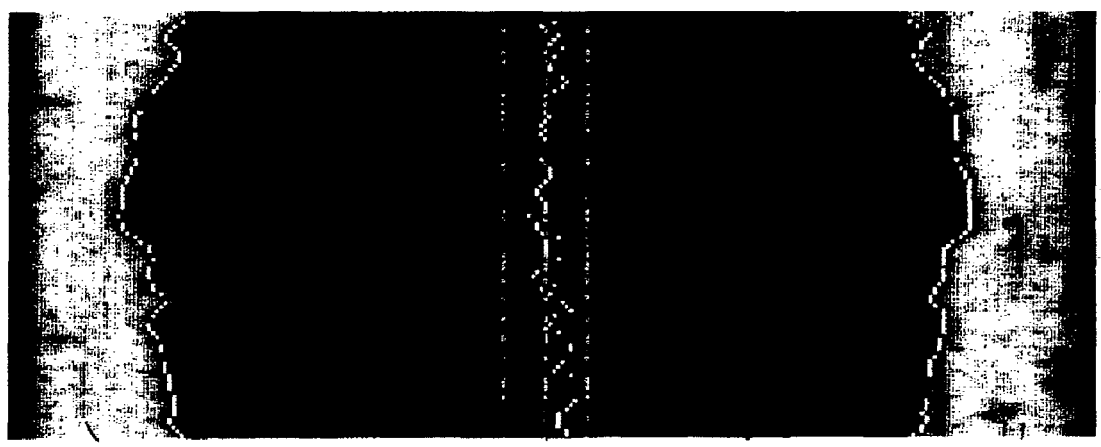
FIG. 5 shows the enlarged illustration of an image-processed double variable-area track.

FIG. 5 shows, enlarged, a detail from the optical sound track 3 with image-processed (black) double variable-area track DZ. The detail illustrates the ideal centre M determined—expanded by a factor of 10—together with the double variable-area track DZ. The ideal centre M is depicted as solid centre line. Two further centre lines $M_l$ and $M_r$ are ±1 pixel remote from the centre M; the further centre lines $M_l$ and $M_r$ advantageously serve as an evaluation aid. The black double variable-area track DZ with pure tone control RB is bounded by an edge on the left and right.

Measurements have revealed that an edge is not always found, and furthermore that an edge that has been found is not always correct. A douple variable-area track has symmetry properties. The two edges of the double variable-area track are symmetrical with respect to one another. The property can advantageously be used for restoration purposes by the variable-area track being mirrored at the centre. A single variable-area track is produced in which image errors due to scratches and spots have only half the brightness intensity.

If, within a line, an edge of the double variable-area track is not found or an edge that has been identified is evidently incorrect, the edge of the opposite side is used, instead of the non-found or erroneous edge, for defining the edge position.

In the event of one edge not being identified, the position of the other edge (position new edge) can be calculated for example according to the following equation:

PositionNewEdge=2●IdealCentre−oppositeEdge

An erroneous edge position is identified if the determined centre of the double variable-area track deviates from the ideal centre by a specific value prescribed by the user.

Erroneous pixels identified in segments of the edge profiles can advantageously be corrected according to the autocorrelation function described in the introduction.

In the event of error concealment, pixels which have been identified as erroneous and lie outside the edges of the double variable-area track are replaced by replacement pixels which have a specific predetermined grey-scale value. In order to employ an error concealment measure, the edge end of the double variable-area track should be defined. It should be defined that the edge end must be at a fixed distance from the edge centre, for example a distance of between 5 and 15 pixels. In the case of a different definition, it might be defined that, proceeding from the edge centre, that pixel is sought in the case of which the brightness with respect to the next pixel remains the same or decreases again.

FIG. 4 shows a flow diagram regarding the above-described measures for processing a double variable-area track which is produced by scanning an optical sound track 3 and is stored as a pixel file with pixel data of in each case 2000 lines in the memory 19.

In the flow diagram of FIG. 4, at 40, the file—stored in the memory 19—with the pixel data of the scanned optical sound track 3 is accessed. At 41, the pixel data are examined to determine whether the two lateral boundaries (edges) of a double variable-area track DZ can be found. If it is determined at 42 that only a single edge is present, at 43 the determined edge is mirrored to the other side. By contrast, if it is determined at 44 that no edge has been found, at 45 the edge of the previous line is used for further processing. If both edges are present, at 46 the centre of the double variable-area track DZ can be calculated.

In a next step 47, a check is made to determine whether the calculated centre deviates considerably from an ideal centre. If that is the case, at 48 a check is furthermore made to determine whether an error is present. In the case to the contrary, at 49 the ideal centre is calculated.

The further course of the signal processing branches depending on whether an error is present within or outside the track course of the double variable-area track DZ. If the error lies within the track course of the double variable-area track DZ, at 50 an erroneous edge is calculated anew. However, if the error lies outside the track course of the double variable-area track DZ, at 51 the erroneous edge is calculated anew according to a correspondingly adapted algorithm. Afterwards, at 52 the centre and the edges of the double variable-area track DZ are drawn and at 53 a file is created which contains image data of the double variable-area track DZ and of the edges and the centre.

For reproduction of the sound information recorded on an optical sound track 3, the image data now present in processed form in a RAW file format are to be converted into audio data of a WAV file format. The conversion is known per se. In the simplest case, the data values of all the pixels of each line are summed line by line, subsequently averaged and then converted into an audio data word. The data sequence of the audio data words generated line by line is transformed into the WAV file format. The WAV file of the recorded optical sound information that is generated in this way can be decoded via the sound card of a PC and be subjected to D/A conversion into analogue sound information for emission via the loudspeaker 24.

The invention has been described using the example of a double variable-area track. The use of the apparatus according to the invention does not remain restricted to the reproduction of optical sound information in a double variable-area track. It goes without saying that the apparatus according to the invention can also be used correspondingly for the reproduction of optical sound information present in single variable-area tracks or multiple variable-area tracks. Furthermore, the apparatus according to the invention can also be used for the reproduction of films which have been recorded in a different film format, for example in a 16 mm film format.

What is claimed is:

1. Apparatus for the reproduction of optical sound recordings, which has an optoelectronic converter device for the optical scanning of an optical sound track, which outputs a digital image signal of the scanned optical sound track at an output, and which contains a device for buffer-storing the image signal output by the converter device, comprising:
a device for the program-controlled data processing of the buffer-stored image signal, which firstly determines the profile of edges of a variable-area track from data values of the image signal and which then generates audio data for a sound reproduction from data of the edge profile determined, wherein, in order to define the edge profile of a variable-area track, the data processing device can be controlled by a program in such a way that the position of sudden brightness changes within a scanning line is determined by evaluation of the distribution of data values of the pixels, representing brightness values.

2. Apparatus according to claim 1, wherein the data processing device can be controlled by a program in such a way that data values of pixels of a plurality of lines, representing brightness values, are subjected to a filtering in order to alter specific brightness values of the pixels according to a predetermined function.

3. Apparatus according to claim 1, wherein the brightness values of the pixels can be altered according to a linear transfer function.

4. Apparatus according to claim 1, wherein the brightness values of the pixels can be altered according to a nonlinear transfer function, in particular according to a cosine function.

5. Apparatus according to claim 1, wherein, for the reproduction of a sound information item recorded in a double variable-area track the data processing device can be controlled by a program such that, in a first step, the position of edge boundaries running transversely with respect to the longitudinal direction of the film is determined using the position of sudden brightness changes in the line profile by evaluation of the data values of the pixels, representing brightness values, that, in a second step, a track centre running between the edge boundaries determined is calculated, that, in a third step, the buffer-stored pixel data are mirrored at the calculated track centre, thereby producing pixel data of a single variable-area track.

6. Device according to claim 5, wherein the program of the data processing device is created for the purpose of error detection such that, during the evaluation of pixel data of a double variable-area track the position region of the track centre is limited by setting an upper and lower threshold.

7. Apparatus according to claim 6, wherein an overshooting of the upper and/or lower threshold of the position region of the track centre determined is assessed as an error in the edge profile of the double variable-area track.

8. Apparatus according to claim 6, wherein the overshooting of a specific boundary in the edge profile of the double variable-area track is assessed as an error in the edge profile of the double variable-area track.

9. Apparatus according to claim 5, wherein the program of the data processing device is created such that, in the case of a double variable-area track, the profile of edge boundaries determined and/or the profile of the track centre is smoothed according to a predetermined function.

10. Apparatus according to claim 1, wherein the program of the data processing device has at least one test routine for detecting errors in a double variable-area track.

11. Apparatus according to claim 1, wherein the program of the data processing device has at least one routine for concealing errors in a double variable-area track.

12. Apparatus according to claim 11, wherein the program of the data processing device is created such that, when errors are detected in pixels of a double variable-area track, the erroneous pixels are replaced by error-free pixels of a preceding line of the double variable-area track.

13. Apparatus according to claim 11, wherein the program of the data processing device is created such that, when errors are detected in pixels between edge boundaries of a double variable-area track the data value of an erroneous pixel is replaced by the data value of a black pixel.

14. Apparatus according to claim 11, wherein the program of the data processing device is created such that, when errors are detected in pixels outside edge boundaries of a double variable-area track the data value of an erroneous pixel is replaced by the data value of a predetermined grey pixel.

15. Apparatus according to claim 11, wherein the program of the data processing device is created such that, when errors are detected in pixels outside edge boundaries of a double variable-area track the data value of an erroneous pixel is replaced by a data value determined by autocorrelation.

16. Apparatus according to claim 15, wherein, in order to calculate the erroneous pixel in segments of the edge profiles by application of an autocorrelation, firstly the following algorithm is calculated:

$$a_{before}(n) = \frac{1}{a(0)} * \sum_{i=0}^{N-1} g(y-i) * g(y-i-n)$$

where
g(y) is a grey-scale value,
y is a line number,
i is a running index from 0 to N-1,
n is a variable of the autocorrelation function where n =0 to N-1.
N is the number of undisturbed lines to be used for restoration, and in that erroneous pixels are then replaced by grey-scale value pixels whose position within a line satisfies the following function:

$$g(z) = \frac{Z+1-z}{Z+1} * g(z - P_{before}) + \frac{z}{Z+1} * g(z + P_{after})$$

where
g(z) denotes a grey-scale value to be replaced.
Z denotes the number of lines to be replaced,
z denotes the line number, $1 \leq z \leq Z$,
$P_{before}$ and $P_{after}$ denote the periodicities in sound tracks before and, respectively, after a detected error.

17. Method for the reproduction of optical sound recordings, comprising:
generating a digital image signal by scanning an optical sound track,
buffer-storing data of the image signal generated,
determining an edge profile of a variable-area track recorded on the optical sound track in a manner dependent on values of the buffer-stored data, and
deriving corresponding audio data for a sound reproduction in a manner dependent on the edge profile determined,
wherein, in order to define the edge profile of a variable-area track, the position of sudden brightness changes within a scanning line is determined by evaluation of the distribution of data values of pixels, representing brightness values.

* * * * *